United States Patent [19]
Kozik et al.

[11] Patent Number: 5,149,918
[45] Date of Patent: Sep. 22, 1992

[54] TOUCH SENSITIVE OVERLAY

[75] Inventors: Andrew F. Kozik; Dennis M. Taylor, both of Charlotte, N.C.

[73] Assignee: International Business Machines Corporation, Armonk, N.Y.

[21] Appl. No.: 620,186

[22] Filed: Oct. 29, 1990

[51] Int. Cl.$^5$ ............................................. G08C 21/00
[52] U.S. Cl. ....................................................... 178/18
[58] Field of Search ............................. 178/18, 19, 20; 340/712, 706

[56] References Cited

U.S. PATENT DOCUMENTS

| | | | |
|---|---|---|---|
| 4,293,734 | 10/1981 | Pepper, Jr. | 178/18 |
| 4,305,071 | 12/1981 | Bell et al. | 340/712 |
| 4,371,746 | 2/1983 | Pepper, Jr. | 178/18 |
| 4,444,998 | 4/1984 | House | 178/19 |
| 4,476,463 | 10/1984 | Ng et al. | 340/712 |
| 4,506,354 | 3/1985 | Hansen | 367/101 |
| 4,567,480 | 1/1986 | Blanchard | 340/712 |
| 4,644,101 | 2/1987 | Jin et al. | 178/18 |
| 4,659,873 | 4/1987 | Gibson et al. | 178/18 |
| 4,680,429 | 7/1987 | Murdock et al. | 178/19 |
| 4,680,430 | 7/1987 | Yoshikawa et al. | 178/19 |
| 4,689,448 | 8/1987 | Snyder et al. | 178/19 |
| 4,700,176 | 10/1987 | Adler | 340/365 |
| 4,720,607 | 1/1988 | de Moncuit | 178/18 |

OTHER PUBLICATIONS

IBM Technical Bulletin, vol. 24, No. 2, "Pressure-Sensing Touch Panel", Jul. 1986.
IBM Technical Bulletin, vol. 16, No. 11, "Pulse Reflection Keyboard", Heath, C. A., Kozik, A. F. and Luderman, C. P., Apr. 1974.

*Primary Examiner*—Stafford D. Schreyer
*Attorney, Agent, or Firm*—Calfee, Halter & Griswold

[57] ABSTRACT

An apparatus having a signal conducting line with first and second ends is provided. The signal conducting line is configured to allow changes of impedance at space locations therealong. The signal conducting line is supported by a substrate. A signal generator is operably connected to the first end of the signal conducting line, the signal generator generating a measuring signal along the signal conducting line. The measuring signal has a predetermined characteristic, over a plurality of time intervals, when the measuring signal is undisturbed. When a disturbance is created in the measuring signal by, for example, the touching of the signal conducting line by a fingertip, the characteristic of the measuring signal varies from a predetermined deviation. Processing circuitry is operably connected to the first end of the signal conducting line so that the time interval at which the measuring signal is disturbed can be determined. The processing circuit includes a correlating circuit, which correlating circuit corresponds the time interval with one of the spaced locations.

18 Claims, 6 Drawing Sheets

TOUCH SENSITIVE OVERLAY

BACKGROUND OF THE INVENTION

The invention relates to a touch sensitive apparatus adapted to locate the coordinates of a point along a line disposed on a substrate, and more particularly to an apparatus for locating a point characterized by an impedance discontinuity in the line generated as a result of the line being contacted by a fingertip or a conductive segment.

Operator interaction with a computer system is greatly facilitated by use of input devices such as keyboards, touch panel devices, and the like. For some users, particularly those who are visually oriented, the art has responded with visually interactive means permitting the user to directly interface with the computer system via a visual display. Indeed there are now many touch control techniques from which the user can choose.

One type of touch control apparatus, commonly referred to as a capacitive touch device, employs a resistive surface having a bounded region which is used for coordinate detecting. In one such capacitive touch device, disclosed in U.S. Pat. No. 4,293,734 to Pepper Jr., the bounded region is a resistive surface having uniform resistivity, a rectangular shape and a terminal at each edge. In the two-axis form of the Pepper, Jr. device, input-output locations are provided for an x-axis and a y-axis. The ratio of the sum of the currents through two of the terminals to the sum of the currents through all four of the terminals is proportional to the distance from one edge. Accordingly, output voltages that are proportional to the x and y coordinates of the point touched are derived simultaneously.

As can be recognized by those skilled in the art, the Pepper Jr. arrangement uses a current ratio means of detecting location in much the same way as a bridge circuit would. In a similar manner, measurements are achieved with a capacitive touch device disclosed in U.S. Pat. No. 4,680,430 to Yoshikawa et al., in which current ratio means are employed to determine separate x and y locations.

Another capacitive touch device is disclosed by U.S. Pat. No. 4,476,463 to Ng et al. The Ng et al. system uses an electrically conductive touch sensitive coated surface with four elongated electrodes connected to the coating, one electrode being provided along each side of the touch sensitive coating. Measurements are made of the change in electrical impedance which a capacitive touch introduces to a resistance-capacitance circuit including the touch sensitive surface. Position of touch is determined by correlating measurements for x-y locations with corresponding capacitive ratio variations.

Still another touch panel device with a touch sensing surface is disclosed in U.S. Pat. No. 4,680,429 to Murdock et al. The Murdock et al. patent permits impedance sensing relative to multiple contacts. In the Murdock system, a touch location along the surface can be determined from the interaction of a finger with touch currents generated by selectively applying alternating current voltage panel scanning signals to the touch sensing surface.

There are distinct drawbacks to employing capacitive touch devices to detect coordinate locations on a resistive surface. In particular, a typical capacitive touch device must be designed with fairly wide spacing between signal traces in order to minimize the effects of stray capacitance. Accordingly, the number of touch sensitive areas per overlay is severely constrained which, in turn, limits the field of information on the display.

Additionally, determining coordinates in more than one dimension typically involves the processing of two or more signals using two or more dedicated circuits. For example, in a preferred embodiment of the Murdock et al. system, at least three currents must be detected in order to determine touch location. Measuring a number of currents and/or voltages as a prerequisite to determining coordinate locations not only promotes complexity in hardware requirements but is very prone to generating error.

Another type of touch control technique exploits the concept of wave propagation to achieve coordinate detection. For example, U.S. Pat. No. 4,689,448 to Snyder et al. is directed toward a two dimensional position coordinate determination device with a U-shaped delay line. A PC grid having conductors is used in conjunction with the U-shaped delay line, which line consists of first and second linear portions. When the grid is contacted by a pointer including a circular flux-producing element, strain waves are generated from the first and second linear portions. The strain waves are propagated along the U-shaped delay line toward a sensor coil. Propagation times associated with x and y coordinates are processed by logic circuitry to obtain the x and y coordinates.

Another wave propagating device, disclosed in U.S. Pat. No. 4,506,354 to Hansen, discloses an apparatus which uses a pair of ultrasonic transducers to determine the position of any of a variety of objects. In a preferred embodiment, the transducers are pulsed at several frequencies and a receiving means senses echoes from each pulse. Selected echoes are used to measure the distance of the object from the transducers to determine the position of the object.

Yet another wave propagating device, disclosed in U.S. Pat. No. 4,700,176 to Adler, employs surface acoustic wave propagation in conjunction with input-output transducers to detect a touch location. In a broad sense, the Adler arrangement may be thought of as an absorption ranging system. In a preferred embodiment, waves are transmitted across a touch surface from one boundary to another opposing boundary. When a fingertip is disposed on the touch surface, acoustic surface wave energy is absorbed and the amplitude of a surface wave burst propagating through the region of the touch is damped. Accordingly, the damping is sensed and the timing information generated thereby is employed to determine which of the plurality of burst propagation pads has been perturbed and thus the location of the touch.

While the wave propagating devices discussed above provide for a wide range of interaction with computer systems that cannot typically be achieved with capacitive touch devices, wave propagating devices still possess certain attributes that, in a significant number of situations, make their use particularly disadvantageous. For example, the arrangements of the Snyder et al., Hansen and Adler patents can be difficult to properly implement. The implementation for each of these patents requires precise positioning of components in order to achieve optimum results. Improper positioning of the transducers in the Adler and Hansen patents, or of the delay line in the Snyder et al. patent, can severely impair operation and generate erroneous results. Moreover, the construction required for each network is extensive, thus increasing manufacturing costs.

In view of the above discussion, a need exists for a touch sensitive apparatus that exploits the advantageous signal processing features of the wave propagating devices, but is no more difficult to implement than the capacitive touch devices. At the same time, the improved touch sensitive apparatus should include as few components as is absolutely necessary for acceptable operation, and yet provide a high degree of flexibility in design and operation.

SUMMARY OF THE INVENTION

According to the invention, an apparatus is provided which is capable of determining coordinates. The coordinate determining apparatus includes a signal conducting line having a first end and a second end. A signal generator is connected to the first end of the signal conducting line for generating a measuring signal along the signal conducting line. The measuring signal has a predetermined characteristic, over a plurality of time intervals, when the measuring signal is undisturbed. The signal conducting line is configured to allow changes of impedance at spaced locations therealong. The measuring signal is disturbed by, for example, touching the signal conducting line at a location with a fingertip. A processing circuit is operably connected to the first end of the signal conducting line for determining the time interval at which the measuring signal is disturbed. The processing circuit includes correlating means for corresponding the time interval with the location at which the signal conducting line is touched. In one example, the correlating means includes a counter, the counter determining a program identifiable count corresponding to the time interval.

In a preferred embodiment, the signal conducting line is a strip of copper etched in a serpentine pattern on a plastic material. A ground line is etched adjacent to and parallel with the signal conducting line so that a discontinuity can be formed by touching the two lines with a finger or a conductive member. Additionally, the signal conducting line has a characteristic impedance and a load that matches the characteristic impedance is connected to the second end of the signal conducting line. As a result of impedance matching, unwanted reflection in the signal conducting line is minimized.

In one preferred form of operation, a pulse is generated at the first end of the line and a first portion of the pulse energy is propagated down the line and a second portion of the pulse energy passes through the counter to start a count. When an impedance discontinuity is developed by a finger touching the apparatus surface, a pulse is reflected back down the line to the counter. The reflected pulse stops the counter at the program identifiable count so that a specific action can be taken by a computer system in response to the program identifiable count.

Numerous advantages will be appreciated by those skilled in the art.

One advantage of the present invention is that it is exceedingly economical. In particular, the invention is easy to manufacture since it only requires, for the most part, the simple etching of conductive material on a plastic substrate. With the etched board in hand, only a few components, which are readily available, need be employed to implement the coordinate determining arrangement. Indeed, the logic used to implement the arrangement is capable of being implemented on one chip. The present invention is cheaper to implement than capacitive type or wave propagating devices and optionally can be used with a keyboard scan code that is recognized readily by existing software and microcode.

Another advantage of the present invention is that, due to its flexibility of design, it provides many features that are not commonly found in the touch overlay art. First, the present arrangement can be constructed with a thin plastic material, preferably of a non polar material such as a polyethylene terephthalate, which can be then directly applied to pre-existing screens. When applied to the screen, the present device can serve as an additional safety option to contain implosion. Second, as a result of the serpentine configuration of the signal conducting line on the overlay, the overlay can serve as an anti-glare filter. Third, since the signal conducting line readily can be etched on just about any dielectric surface, there is virtually no size constraint in the overlay's application. That is, the overlay can be applied to small screens just as easily as large screens. Finally, the overlay can be conformed for use on three dimensional objects with the ability to determine three dimensional coordinates precisely and accurately from a single signal.

Another advantage of the present invention is that it provides a high level of performance. The number of coordinate locations that can be configured on the overlay is great enough to provide for virtually every option which would be desired in any touch screen arrangement. Indeed, a minimal amount of measurement and processing is required to achieve highly desirable results. Finally, since the technique is simple to apply and theoretically well-founded, it allows for the achievement of results having minimal error.

These and other features, advantages and objects of the present invention will be further understood and appreciated by those skilled in the art by reference to the following written specification, claims and appended drawings.

BRIEF DESCRIPTION OF THE DRAWINGS

FIG. 2b is a perspective side view of the printed circuit board of FIG. 2a;

DESCRIPTION OF THE PREFERRED EMBODIMENT

Figure 1:
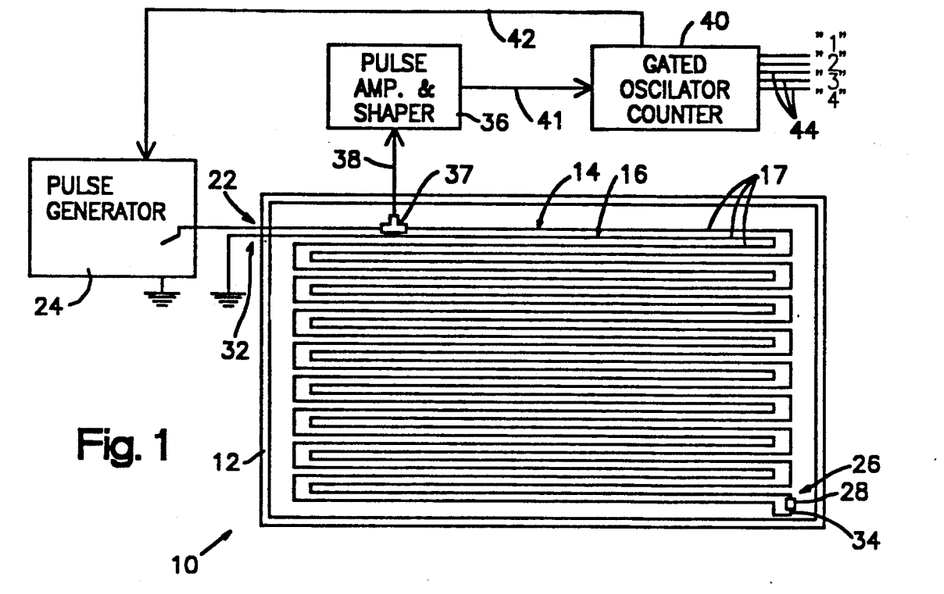
FIG. 1 is a basic diagrammatic representation of the touch screen overlay according to the present invention.

Referring to FIG. 1, a touch-sensitive overlay embodying the present invention is indicated by the numeral 10. The touch-sensitive overlay 10 includes a substrate 12 upon which a signal conducting line 14 and a ground line 16 are disposed. In the preferred embodiment, each of lines 14, 16 is implemented by etching or otherwise "drawing" a microstrip serpentine pattern on a transparent media through use of copper clad plastics. Use of materials other than copper to construct lines 14, 16 is contemplated by the present invention. While in the illustrated embodiment substrate 12 is a polyethylene terephthalate, the substrate 12 could be constructed of other flexible or rigid dielectric materials without impairing the operation of touch-sensitive overlay 10.

Each serpentine pattern is formed by a plurality of longitudinal segments 17 arranged in a continuous fashion. For experimental purposes (FIGS. 2a and 2b), a microstrip serpentine pattern, such as that mentioned above, can be achieved by jumping etched wires 17 of a printed circuit board ("PCB") 19 with conventional connectors 20.

As best illustrated in FIG. 1 the signal conducting line 14 has a first end 22, the first end 22 being interconnected with signal generator 24. In the preferred embodiment, the signal generator 24 is a conventional pulse generator. A second end 26 of signal conducting line 14 is interconnected with an impedance load 28.

Preferably, the impedance of load 28, namely $Z_{Load}$, is matched to the characteristic impedance of the signal conducting line 14, namely $Z_O$. The magnitude of $Z_O$ (characteristic impedance) is attributed to, among other factors, the input impedance of signal generator 24, $Z_S$, as well as the distributed impedance of signal conducting line 14 $Z_{Line}$. By matching $Z_{Load}$ with $Z_O$, any reflection generated by the second end 26 of signal conducting line 14 is not critical to operation of the touch-sensitive overlay 10. That is, the invention can be implemented sufficiently even when the second end 26 is left open so that the impedance of $Z_{Load}$ is infinite.

Ground line 16, having a first end 32 and a second end 34, is physically disposed parallel with and adjacent to the signal conducting line 14. In the preferred embodiment, the ground line 16 is positioned relatively close to signal conducting line 14 so that discrete portions of lines 14, 16 can be interconnected selectively by a fingertip or any suitable conductive member. To achieve optimum grounding, both ends 32, 34 of ground line 16 are shorted to ground.

Referring still to FIG. 1 the signal conducting line 14 is coupled to a pulse amplifier and shaper 36 by way of a coupler 37 and a line 38. In one example, the pulse amplifier and shaper 36 includes an operational amplifier (not shown) and a shaping circuit (not shown). (Of course, other well known shaping circuits could be employed.) The pulse amplifier and shaper 36 communicates with a counter 40 by way of line 41. In the preferred embodiment, the counter 40 is a gated oscillator counter communicating with signal generator 24 by way of line 42. As will be explained in further detail below, a command signal is transmitted across one of lines 44 to a computer system in response to a program identifiable count representative of a reflection delay. The conceptual framework of the hardware employed to implement the interface between lines 44 and the computer system is described below.

Figure 3:
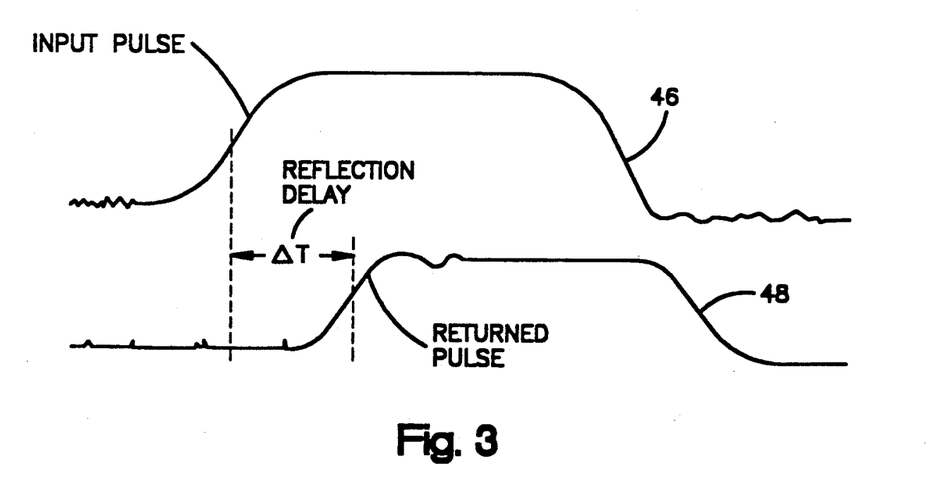
FIG. 3 is a schematic representation of pulses generated along the touch screen overlay.
Figure 4:
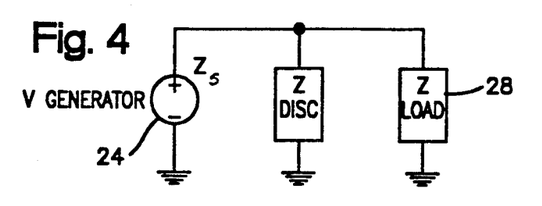
FIG. 4 is a schematic representation of a circuit developed during use of the touch screen overlay.

The theory of operation for touch-sensitive overlay 10 will be generally understood by reference to FIG. 3. A fast rise time pulse, having a magnitude of $E_o$ and being indicated by the numeral 46, is introduced at the first end 22 of signal conducting line 14. The pulse 46 travels down the signal conducting line 14 to the second end 26 for absorption by load 28 unless a discontinuity, i.e. $Z_{Disc}$ develops in the signal conducting line 14 between the ends 22, 26. In response to the discontinuity, which develops as a result of one or both of the lines 14, 16 being contacted by a finger or a conductive member, the lines 14, 16 are configured into a circuit with two parallel impedances (FIG. 4) that are connected to a common ground. One of the impedances, $Z_{Disc}$, is formed by the fingertip or connecting member, and the other impedance, $Z_{Load}$, is formed by the load 28.

The change in impedance of signal conducting line 14 due to $Z_{Disc}$ results in a reflected wave or pulse 48 having a magnitude of $E_R$. As best illustrated in FIG. 3, the reflection delay, T, between the leading edges of pulses 46, 48 corresponds with the location or time interval at which the finger or connecting segment first contacts one or both of the lines 14, 16. The invention can be implemented without using ground line 16, since $Z_{Disc}$ can be developed by a human body as with capacitive touch screens. Use of ground line 16, however, allows for signal resolution that is not achieved readily when the human body serves as the ground line 16.

The theory of operation is in contradistinction to the typical touch screen arrangement in at least two respects. First, the touch location corresponds to a reflection delay which can be achieved simply by touching simultaneously portions of line segments 17, 18 with a fingertip or conductive member. Second, because of the presence of ground line !6, reflection delay is unaffected, to any considerable extent, by the impedance of the body. That is, while the parallel branch including $Z_{Disc}$ is formed With the fingertip, current flows through the fingertip, and not the whole finger. Hence, resolution of the reflected pulse is not affected by the impedance of the entire finger and body, both of which can fluctuate with the user.

Figure 5:
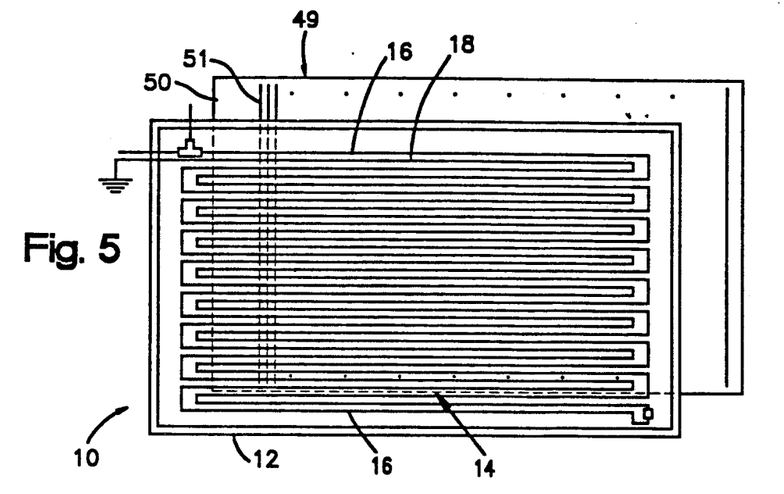
FIG. 5 is a top plan view of a shorting board overlapped by the touch sensitive overlay.

Resolution of the reflected signal can be increased by overlapping a shorting board 49 (FIG. 5), having a substrate 50 upon which parallel lines 51 are disposed, with the touch sensitive overlay 10. The lines 51 are positioned substantially normal to longitudinal segments 17. Consequently, a short can be achieved between discrete portions of longitudinal segments 17 when a portion of substrate 12 is depressed so that the discrete portions of longitudinal segments 17, are in contact with a segmental portion of one of lines 51.

Figure 6:
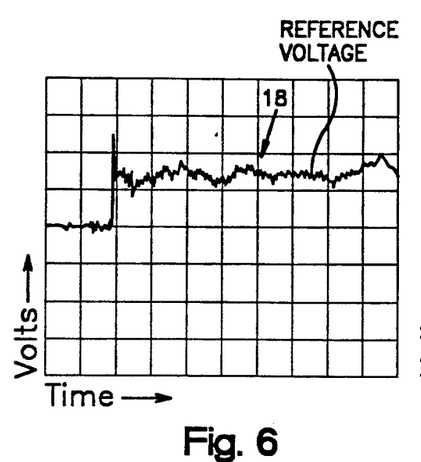
FIG. 6 is a time-magnitude graphical representation of a reference voltage developed along the touch sensitive overlay.

Operation of the touch screen arrangement is further explained by reference to FIGS. 1 and 6–10. Initially, a reference pulse (FIG. 6) is transmitted down signal conducting line 14 to develop a reference signal therealong. FIG. 6 represents the magnitude of voltage across the entire length of line 14 as the voltage would be viewed on an oscilloscope connected to line 38. As will be appreciated by those skilled in the art, the time abscissa of the reference voltage analogously corresponds to the length of line 14. Under ideal circumstances, the reference voltage would be flatter than the curve of FIG. 6, but use of the PCB 19, with its connectors 20, produces a curve that falls somewhat short of the ideal. In the most preferred embodiment, the touch-sensitive overlay 10, which is two continuous microstrips 14, 16 etched or otherwise disposed on substrate 12 in a serpentine pattern, provides a much flatter curve for the reference voltage.

Figure 2A:
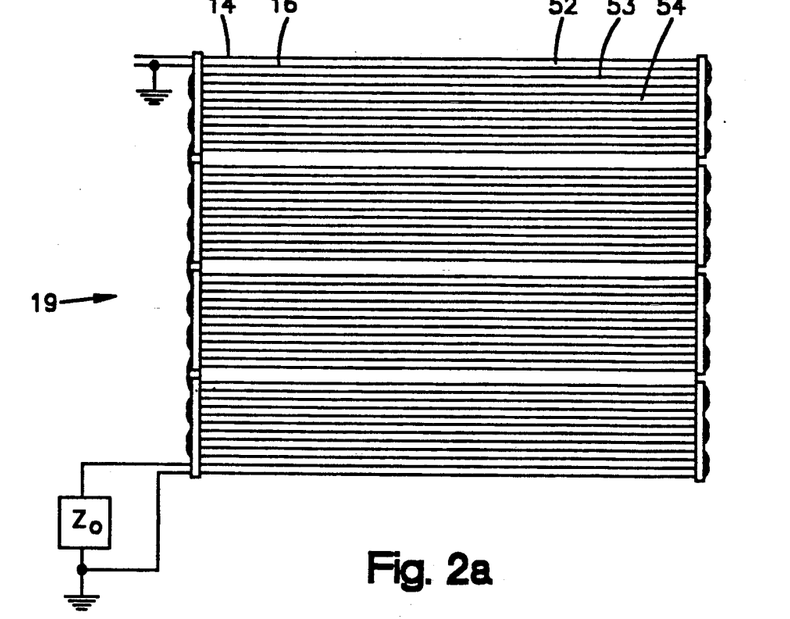
FIG. 2a is a top plan view of a printed circuit board used to implement a prototype of the touch screen overlay.
Figure 2B:
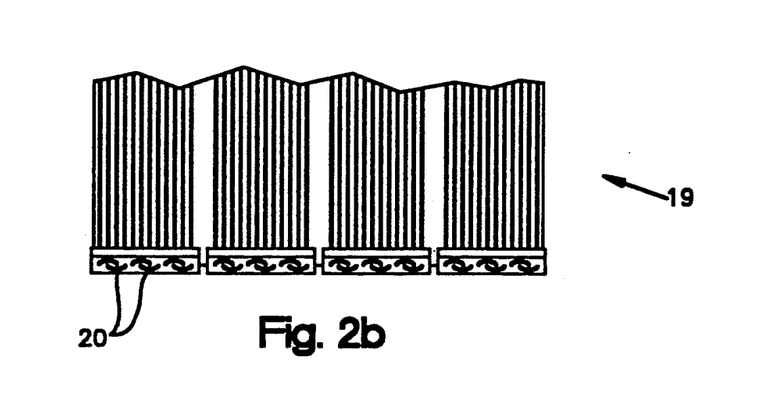
Figure 7:
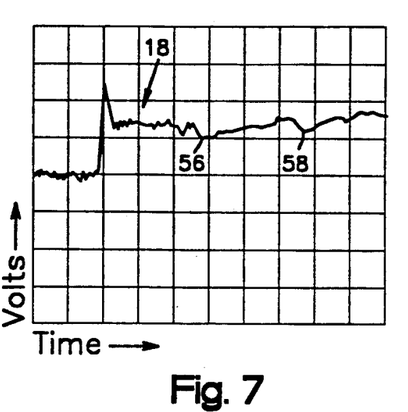
FIG. 7 is a time-magnitude graphical representation of the reference voltage taken along a portion of the touch sensitive overlay.

In the experimental arrangement, small discontinuities created by the connectors 20 can be used to "mark" the signal conducting line 14. Referring to FIG. 7, the reference voltage is shown for a relatively short time interval (as trace 18); the reference voltage in the graph of FIG. 7 is distributed across two reflections 56 and 58 (FIG. 7) disposed along the upper portion of the PCB 19 (FIG. 2a). In the experimental arrangement, a trace is defined by a single segment 17 of signal conducting line 14. Each trace is connected to the next adjacent trace by one of the connectors 20 (FIG. 2b).

The effect of two connectors 20 (FIG. 2b) on the reference voltage is designated by the arrows 56 and 58 (FIG. 7). The slight, but distinctive disturbances of connectors 20 on the curve (reflected pulse) of the reference voltage serve to mark the location of one of connectors 20. It should be appreciated that signal conducting line 14 of the most preferred embodiment, i.e. the embodiment of FIG. 1, can be marked by simply placing impedances in line 14 at predesignated locations.

Figure 8:
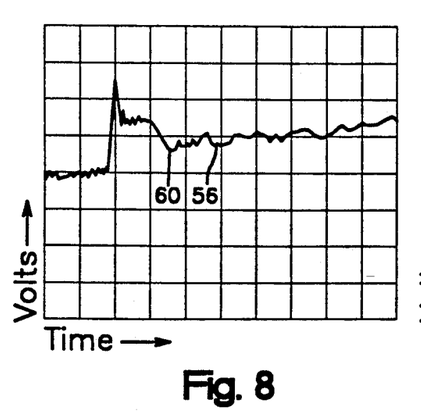
FIG. 8 shows the reference signal of FIG. 7 disturbed at a first point along the touch sensitive overlay.
Figure 9:
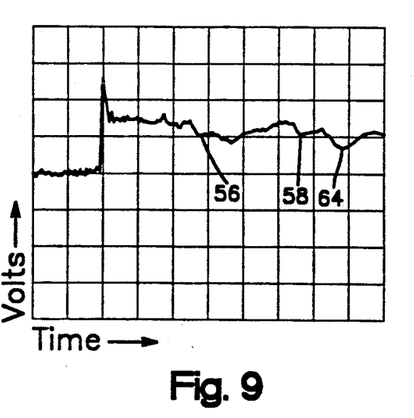
FIG. 9 shows the reference signal of FIG. 7 disturbed at a second point along the touch sensitive overlay.

Referring to FIG. 8, the effect of a discontinuity at a point along the trace 18, caused by the touching of the signal conducting line 14 and ground line 16 with a fingertip, is shown. A discontinuity developed along the trace 18 results in a reflected disturbance of the measuring signal, which disturbance is indicated by the reference character 60. The disturbance 60 in the measuring signal corresponds with a time interval. As illustrated in FIG. 9, touching a further point along the trace 18 causes a disturbance in the reference voltage curve at a point, designated by a reference characteristic 64, which disturbance is farther down the trace than the disturbance 60 in FIG. 8.

In one embodiment, a time interval for a given disturbance can be determined graphically on the oscilloscope. Alternatively, the time interval can be determined by analyzing the disturbed reference voltage curve with a digital signal processor connected to the line 38, determining the time corresponding to the point on the trace of the disturbance.

In the most preferred embodiment (FIG. 1), the time interval, i.e. the moment at which the reference signal is disturbed, is determined by use of the arrangement including the pulse generator 24, the pulse shaper and amplifier 36 as well as the counter 40. As will be appreciated from the discussion below, use of this arrangement allows for the correlation of reflection delays with specific computer functions. In the arrangement of FIG. 1, the pulse generator 24 is signaled by the counter 40 via line 41 to send the pulse 46 (FIG. 3) down the signal conducting line 14. The transmitted pulse 46 is sampled at coupler 37 where one portion of the pulse 46 is transmitted to the pulse shaper and amplifier 36, and the other portion of pulse 46 is transmitted down the signal conducting line 14. The pulse shaper and amplifier 36 is employed, if necessary, to increase the magnitude of the reflected signal pulse 48 improving its signal-to-noise ratio.

Figure 10:
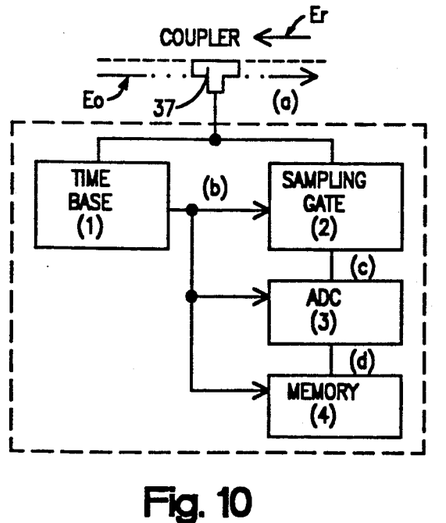
FIG. 10 is a schematic representation of both a circuit used to implement a pulse amplifier and shaper as well as a gated oscillator counter for the touch sensitive overlay.

An implementation of the pulse amplifier and shaper 36, as well as the gated oscillator counter 40, is shown in FIG. 10. As illustrated in FIG. 10, a sampling gate, analog-to-digital converter (ADC), and memory section are shown interconnected with the line 14 and a time base. The time base may be provided by a clock on a chip and the pulse amplifier and shaper 36 serves as the sampling gate. The sampling gate can be implemented with an operational amplifier and a Schmidt trigger, while the ADC can be constructed with conventional components. The gated oscillator counter 40 is implemented by use of the ADC and the memory section. As can be recognized, the time base serves as the virtual "heartbeat" for the pulse amplifier and shaper 36, as well as the gated oscillator counter 40.

Figure 11:
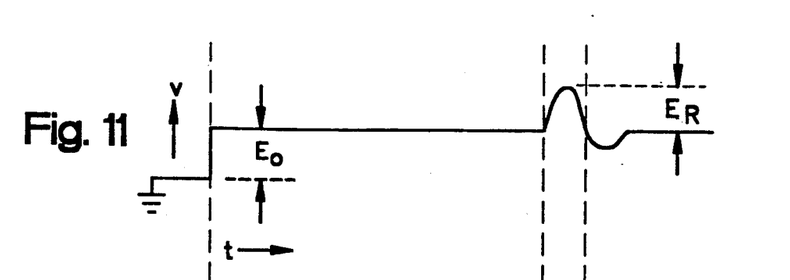
FIG. 11 is a graphical analog representation of the touch sensitive overlay disturbed by a fingertip.
Figure 12:
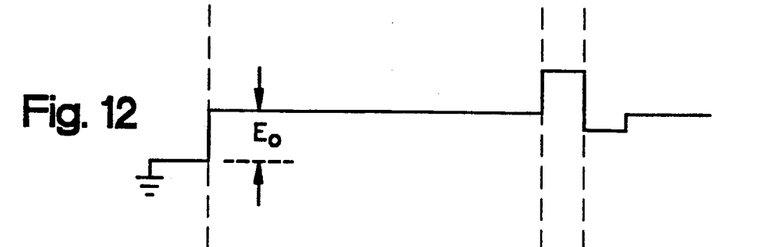
FIG. 12 represents the curve of FIG. 11 processed in the form of amplitude samples.
Figure 13:
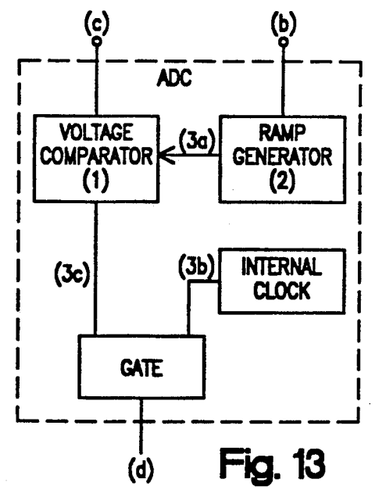
FIG. 13 is a schematic representation of the internal structure of the analog-to-digital converter used in the arrangement of FIG. 10.

Referring to FIG. 11, the above-mentioned fast rise time pulse 46 for the impedance matched signal line 14 is shown in a disturbed state. That is, the reference pulse 46 is disturbed by a fingertip having RLC characteristics, so that reference and reflected pulses combine to form a measuring signal including an oscillating portion. The oscillatory portion of the measuring signal represents the affect of the fingertip. The curve of FIG. 11, as outputted from the sampling gate in the form of amplitude samples is shown in FIG. 12. The amplitude samples of FIG. 12 are processed through the ADC, the block structure of which is shown in FIG. 13.

Figure 14:
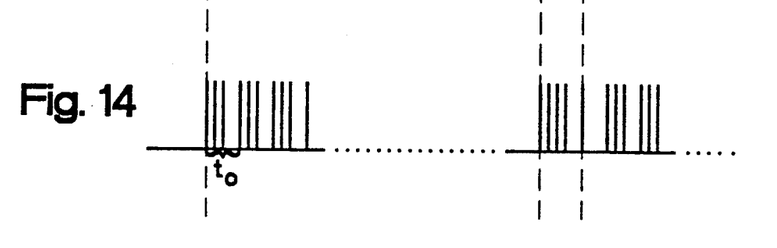
FIG. 14 shows the curve of FIG. 12 in digitized form.
Figure 15:
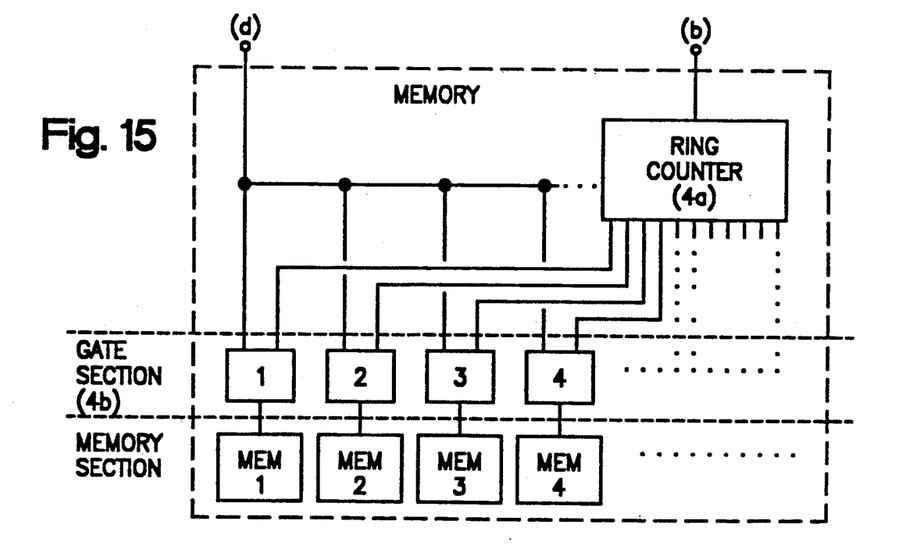
FIG. 15 is a schematic representation of the hardware used to implement the memory of the arrangement of FIG. 10.

Referring to FIG. 14, a representation of the amplitude samples, as digitized by the ADC, is shown. Counting of the digitized amplitude samples is performed in the memory section, the internal structure of which is shown in FIG. 15. The ring counter of FIG. 15 is an "off-the-shelf" component and the gates are, in one example, cascaded flip-flops. The components used to compile the memory subsections of the memory section are conventional.

In operation, the digitized pulses of FIG. 14 are counted over predesignated time intervals, $t_D$, starting at the spike representing the initial rise time of the curve of FIG. 12. An interval count $N_{INT}$ is determined for each interval counted, and a cumulative count or total count, $N_{TOT}$, is generated as the count proceeds sequentially from one gate to the next. $N_{TOT}$ is tabulated at each gate as the process moves forward. The counting process continues until the count interval, $N_{INT}$, differs from a predesignated interval count, $N_{DES}$, or until a predetermined value of $N_{TOT}$ has been reached. If the predetermined value of $N_{TOT}$ is reached, then the counting process begins anew. For any time interval if $N_{INT}$ differs from $N_{DES}$ by a designated margin, i.e. $e_{MAR}$, then the counting process is halted and $N_{TOT}$ i.e. the count corresponding to the program identifiable count, is stored in memory for use by the I/O section of a computer or the like.

An example of operation can be appreciated by way of FIG. 14. For each interval $t_D$, the interval count, i.e. $N_{INT}$, is three as long as the magnitude of the pulse at the sampling gate (FIG. 10) is $E_o$, i.e. the magnitude of pulse 46. When $E_o$ is supplemented by the magnitude of the reflected wave $E_R$, the interval count increases by $e_{MAR}$ to four. As soon as the value of $N_{INT}$ differs from $N_{DES}$ by $e_{MAR}$, the counter 40 is turned off and the cumulative count or program identifiable count, i.e. $N_{TOT}$, is tabulated up to that moment. The program identifiable count is then used to generate I/O information for the computer. As will be recognized, the values for the interval counts chosen in the above example are arbitrary and could vary considerably in actual operation.

Figure 16:
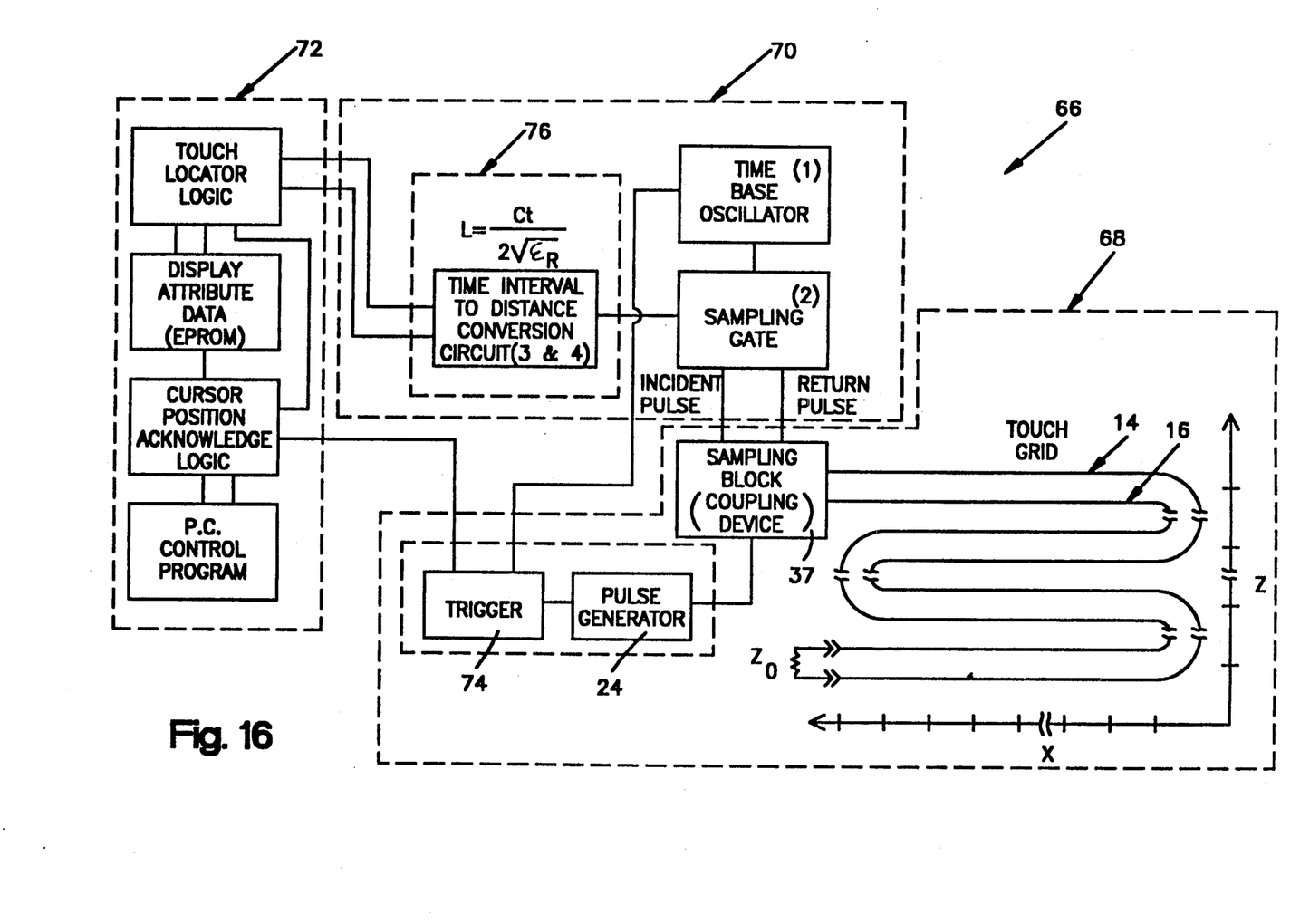
FIG. 16 is a schematic representation of a network employed to interface the touch sensitive overlay with a computer.

Referring to FIG. 16, a network including much of the circuitry discussed above, is indicated by the numeral 66. The network 66 includes a sampling circuit 68, a counting circuit 70, and an I/O interface circuit 72. The sampling circuit 68 includes the coupler 37 which is connected to the line 14 as well as a trigger 74 and the pulse generator 24.

The counting circuit 70 includes a time base oscillator, a sampling gate and a "time interval to distance conversion circuit 76," all of which operate conjunctively to provide the functions of the pulse amplifier and shaper 36 as well as the gated oscillator counter 40. To indicate the equivalence of circuit 70 and the implementation of FIG. 10, the parenthetical numerals (1)-(4) have been employed to draw attention to common components.

The circuit 76 generates a program identifiable count relating to a time interval at which the line 14 is touched by the fingertip. The circuit 76 uses the following equation to convert the program identifiable count to a length, L, representing the distance from the initial point of the line 14 to the point at which the line 14 is touched by the fingertip:

$$L=[(c)(t)]/[2.0(\epsilon_R)^{\frac{1}{2}}]$$

where:
c = velocity of light in a vacuum
t = time (between incident and reflected pulse)
$\epsilon_R$ = relative permitivity (dielectric constant)

The circuit 76 communicates with the I/O interface circuit 72 to convert the distance parameter into appropriate I/O information for use on the computer. As should be recognized, there is no need for this information to be placed in the form of coordinates to generate I/O information. This is in direct contradiction to prior art embodiments in which information must be gathered for multiple axes.

The I/O interface circuit 72 allows the computer-related hardware logic and program software to treat the program identifiable count or distance as an I/O condition. It should be recognized that a PC control program block cooperatively operates with cursor position acknowledge logic to provide an interrupt for the computer so that pulses can be transmitted down signal conductor line 14 and the touch locator logic can be coordinated by a cursor position acknowledge logic.

The above description is directed toward an exceedingly simple, yet effective touch sensitive overlay. The overlay is easy to manufacture and possesses a particularly flexible design. Additionally, the number of coordinate locations that can be configured on the overlay is great enough to provide for virtually every option which would be desired in any touch screen arrangement. Finally, the overlay can be employed with equal facility on two dimensional surfaces and three dimensional objects without affecting its ability to determine coordinates. It should be borne foremost in mind that while the overlay is capable of determining coordinates in multiple dimensions, it indeed only uses one measured value, i.e. time to fulfill such capacity.

Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. An apparatus adapted to determine coordinates comprising:
    a signal conducting line having a first end and a second end, the signal conducting line being configured to allow changes of impedance at an unlimited number of spaced locations therealong when a finger is placed in direct contact with any of said unlimited number of spaced locations on the signal conducting line, said signal conducting line having a characteristic impedance;
    a single ground line having first and second ends, at least one of said first and second ends being grounded, said ground line being disposed substantially parallel to said signal conducting line;
    support means for supporting a portion of the signal conducting and ground lines;
    a signal generator connected operably to the first end of the signal conducting line, the signal generator generating a measuring signal along the signal conducting line, the measuring signal having a predetermined voltage characteristic over a plurality of time intervals when the measuring signal is undisturbed, the voltage characteristic of the measuring signal varying from the predetermined characteristic by a deviation that is greater than a predetermined deviation when a disturbance develops in the measuring signal at one of the time intervals;
    an electrical load operably connected to the second end of the signal conducting line, said electrical load having an impedance which is substantially equivalent to the characteristic impedance of said signal conducting line; and
    processing means operably connected to the first end of the signal conducting line for determining the time interval during which the measuring signal is disturbed, the processing means including a memory device for storing a plurality of said unlimited number of spaced locations and correlating means for corresponding the time interval with one of the spaced locations stored in said memory device.

2. The apparatus of claim 1, wherein the ground line and the signal conducting line each comprise a strip of conductive material, and wherein the support means includes a dielectric substrate upon which the conductive material is disposed.

3. The apparatus of claim 2, wherein the strip of conductive material is disposed on the dielectric substrate in a serpentine pattern.

4. The apparatus of claim 2, wherein the conductive material is copper.

5. The apparatus of claim 2, wherein the conductive material is etched on the substrate.

6. The apparatus of claim 5, wherein the dielectric substrate is a plastic material.

7. The apparatus of claim 6, wherein the plastic material is a non-polar material.

8. The apparatus of claim 2, wherein the magnitude of the impedance is about 100 ohms.

9. The apparatus of claim 2, wherein the signal generator is a pulse generator.

10. The apparatus of claim 2, further comprising a signal shaping and amplifying means for shaping and amplifying the measuring signal.

11. The apparatus of claim 10 wherein the pulse shaping and amplifying means includes:
    an operational amplifier, the operational amplifier amplifying the measuring signal; and
    a shaping circuit.

12. The apparatus of claim 2, wherein the processing means further comprises a gated oscillator counter, the counter counting one or more sets of pulses over the plurality of time intervals to determine the time interval at which the measuring signal is disturbed.

13. The apparatus of claim 2, further comprising means for increasing the resolution of the measuring signal.

14. The apparatus of claim 13, wherein the means for increasing resolution includes a conductive segment adapted to simultaneously contact a point on the signal conducting line and a point on the ground line, and wherein when the conductive segment is brought into contact with the points the signal conducting line is shorted to the ground line.

15. A method for determining coordinates, comprising the steps of:
    providing a signal conducting line having a first end, a second end and a characteristic impedance;
    providing a single ground line having first and second ends, said ground line disposed substantially parallel to said signal conducting line;
    configuring the signal conducting line to allow for changes of impedance at an unlimited number of spaced locations therealong when a finger is placed in direct contact with any of said unlimited number of spaced locations on the signal conducting line;
    operably connecting an electrical load to said second end of said signal conducting line, said electrical load having an impedance substantially equivalent to that of said signal conducting line;
    generating a measuring signal along the signal conducting line, the measuring signal having a predetermined voltage characteristic over a plurality of time intervals when the measuring signal is undisturbed;
    wherein the voltage characteristic of the measuring signal varies from the predetermined characteristic by a deviation that is greater than a predetermined deviation when a disturbance develops in the measuring signal at one of the time intervals;
    storing a plurality of said unlimited number of spaced locations in a memory device;
    determining the time interval at which the measuring signal is disturbed; and
    correlating the time interval with one of the spaced locations stored in said memory device.

16. The method of claim 15, wherein the signal conducting line includes a strip of conductive material, and wherein the support means includes a substrate upon which the conductive material is disposed.

17. The method of claim 15, wherein the strip of conductive material is disposed on a dielectric substrate in a serpentine pattern.

18. The method of claim 15, wherein the step of determining the time interval includes counting one or more sets of pulses until one of the measuring signal is disturbed and a predetermined time period has expired.

* * * * *